United States Patent
Rakshit et al.

(10) Patent No.: US 10,678,492 B1
(45) Date of Patent: Jun. 9, 2020

(54) CO-LOCATED AUGMENTED REALITY SHARING BETWEEN AUGMENTED REALITY DEVICES

(71) Applicant: International Business Machines Corporation, Armonk, NY (US)

(72) Inventors: Sarbajit K. Rakshit, Kolkata (IN); Martin G. Keen, Cary, NC (US); John M. Ganci, Jr., Raleigh, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/200,856

(22) Filed: Nov. 27, 2018

(51) Int. Cl.
*G06F 3/14* (2006.01)
*G02C 7/04* (2006.01)
*H04L 29/06* (2006.01)

(52) U.S. Cl.
CPC ............. *G06F 3/1454* (2013.01); *G02C 7/04* (2013.01); *H04L 67/38* (2013.01)

(58) Field of Classification Search
CPC .......... G06F 3/1454; G02C 7/04; H04L 67/38
See application file for complete search history.

(56) References Cited

U.S. PATENT DOCUMENTS 9,812,096 B2  11/2017  Deering et al.
9,818,228 B2  11/2017  Lanier et al.
2012/0249591 A1  10/2012  Maciocci et al.
2013/0293468 A1  11/2013  Perez et al.
2016/0091737 A1   3/2016  Kim et al.
2016/0104452 A1   4/2016  Guan et al.
2017/0115742 A1   4/2017  Xing et al.
(Continued)

FOREIGN PATENT DOCUMENTS

EP    3062219    8/2016

OTHER PUBLICATIONS

W. Knight, "Microsoft Researchers Are Working on Multi-Person Virtual Reality," Oct. 12, 2015 [Accessed Jan. 26, 2018] https://www.technologyreview.com/s/542341/microsoft-researchers-are-working-on-multi-person-virtual-reality/,3 pages.
(Continued)

*Primary Examiner* — Dmitriy Bolotin
(74) *Attorney, Agent, or Firm* — Schmeiser, Olsen & Watts, LLP; Brian Restauro

(57) ABSTRACT

A system and method for displaying co-viewed augmented reality includes generating an augmented reality experience associated with a first augmented reality device configured to be worn by the user, connecting the first augmented reality device with a second augmented reality device, tracking a first field of view of the first user and a second field of view of the second user to detect an instance of a matching field of view, detecting that the second user has rendered an augmentation within the matching field of view, applying a set of specific augmented reality sharing rules to determine whether to augment the augmented reality experience associated with the first augmented reality device to display the augmentation rendered by the second user in the matching field of view, and rendering the augmentation within the augmented reality experience as a function of applying the set of specific augmented reality sharing rules.

18 Claims, 13 Drawing Sheets

(56) References Cited

U.S. PATENT DOCUMENTS

2019/0107935 A1* 4/2019 Spivack .................. G06F 3/011
2019/0108578 A1* 4/2019 Spivack .................. G06T 11/60

OTHER PUBLICATIONS

K. Kiyokawa, "Communication Behaviors of Co-located Users in Collaborative AR Interfaces." Proceedings. International Symposium on Mixed and Augmented Reality, 2002, pp. 139-148.

M. Billinghurst, "Collaborative augmented reality." Commun. ACM 45, 7 (Jul. 2002), 64-70. 2002.

T. Ohshima, "AR2Hockey: A Case Study of Collaborative Augmented Reality." Proc. IEEE Virtual Reality Annual International Symposium (VRAIS'98), pp. 268-275, Atlanta, USA, Mar. 14-18, 1998.

M. Agrawala, "The two-user Responsive Workbench: support for collaboration through individual views of a shared space" In Proceedings of the 24th annual conference on Computer graphics and interactive techniques (SIGGRAPH 97). ACM Press/Addison-Wesley Publishing Co., New York, NY, USA, 327-332,1997.

H. Regenbrecht, "Interaction in a Collaborative Augmented Reality Environment," CHI 2002, Apr. 20-25, 2002, Minneapolis, Minnesota, USA, pp. 504-505, 2012.

Anonymous, "Method and System for Facilitating Fast Collaborative Engagement of Users using Augmented Reality (AR)." IP.com Disclosure No. IPCOM000250397D, Publication Date: Jul. 11, 2017.

Anonymous, "The 360 Workspace: next-generation collaboration experiences with intuitive interaction and immersive mixed-reality." IP.com Disclosure No. IPCOM000211187D, Publication Date: Sep. 26, 2011.

T. Piumsomboon, "CoVAR: Mixed-Platform Remote Collaborative Augmented and Virtual Realities System with Shared Collaboration Cues," 2017 IEEE International Symposium on Mixed and Augmented Reality (ISMAR-Adjunct), Nantes, 2017, pp. 218-219.

* cited by examiner

CO-LOCATED AUGMENTED REALITY SHARING BETWEEN AUGMENTED REALITY DEVICES

TECHNICAL FIELD

The present invention relates to systems and methods for co-located augmented reality sharing, and more specifically the embodiments of an augmented reality sharing system for determining whether to share augmentations between co-located devices.

BACKGROUND

Existing augmented reality (AR) technology uses smart contact lenses for use with augmented reality. In some cases, collaborative augmented reality enables multiple users to all see the same augmentations rendered in an augmented reality experience. Further, existing AR technology allows multiple participants to interact with two-dimensional data and three-dimensional data using tangible user interfaces.

SUMMARY

An embodiment of the present invention relates to a method, and associated computer system and computer program product for displaying co-viewed augmented reality. A processor of a computing system generates an augmented reality experience associated with a first augmented reality device configured to be worn by the user. The first augmented reality device is connected with a second augmented reality device configured to be worn by a second user in response to detecting that the second augmented reality device is co-located with the first user. A first field of view of the first user and a second field of view of the second user is tracked to detect an instance of a matching field of view between the first user and the second user. A rendered an augmentation over an object is detected within the matching field of view. A set of specific augmented reality sharing rules is applied to determine whether to augment the augmented reality experience associated with the first augmented reality device to display the augmentation rendered by the second user in the matching field of view. The augmentation is rendered within the augmented reality experience associated with the first augmented reality device as a function of applying the set of specific augmented reality sharing rules.

DETAILED DESCRIPTION

Figure 1:
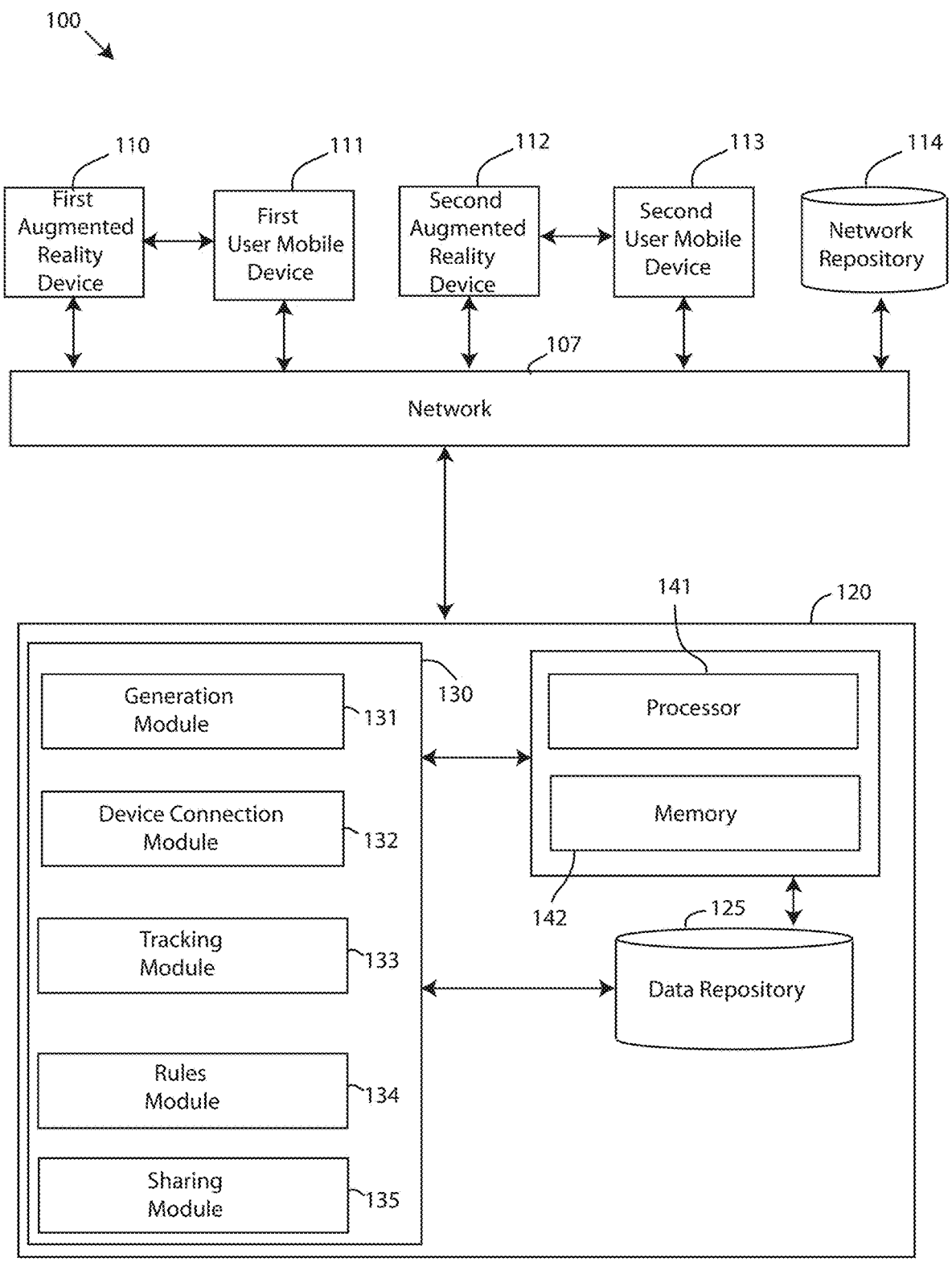
FIG. 1 depicts a block diagram of an augmented reality sharing system, in accordance with embodiments of the present invention.

Referring to the drawings, FIG. 1 depicts a block diagram of an augmented reality sharing system 100, in accordance with embodiments of the present invention. The augmented reality sharing system 100 is a system for displaying co-viewed augmented reality. Existing AR devices allow for two-dimensional information and three-dimensional information to be seamlessly integrated into the system for sharing augmentations, but without specific rules that govern the shared augmentations between AR devices. The augmented reality sharing system 100 may be useful for monitoring fields of view of two or more co-located users wearing augmented reality devices to determine whether augmentations rendered by one user should be shared or otherwise paired with the other user's augmented reality experience looking at the same object as the other user. Embodiments of the augmented reality sharing system 100 may be alternatively referred to an augmented reality sharing rules application system, a co-located augmented reality sharing system, and the like.

The augmented reality sharing system 100 includes a computing system 120. Embodiments of the computing system 120 include a computer system, a computer, a server, one or more servers, a backend computing system, and the like.

Furthermore, the assisted learning system 100 includes a first augmented reality device 110, a first user mobile device 111, a second augmented reality device 112, and a second user mobile device 113 that are communicatively coupled to the computing system 120 over a network 107. For instance, information/data is transmitted to and/or received from the first augmented reality device 110, the first user mobile device 111, the second augmented reality device 112, and the second user mobile device 113 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases 114, which are network repositories containing information of the user preferences, user activity, user predefined rules, specific sharing rules, user location, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the user preferences, user activity, user predefined rules, specific sharing rules, user location, etc., and the like, to generate both historical and predictive reports regarding a particular user or a particular user augmented reality sharing preferences, usage, rules, etc. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The first augmented reality device 110 is an AR device that can be used by a first user for displaying AR in the first user's environment. The first augmented reality device 110 is configured to be worn by the first user. In an exemplary embodiment, the first augmented reality device 110 is a smart contact lens configured to be worn directly in the eye of the first user. The smart contact lens supports AR and has necessary components for communicating with the computing system 120 and optionally the first user mobile device 111. The first user mobile device 111 can be a cell phone, a mobile computing device, a smartphone, a tablet computer, a laptop computer, a wearable computing device, a smartwatch, or similar an internet-connected mobile device. The first user mobile device 111 can include hardware functionality such as a speaker for emitting a sound, a vibration motor for creating vibrations, a display for displaying images, text, messages, videos, pictorial sequences, etc., a light emitting element for emitting a light, a receiver for receiving communications, a transmitter for transmitting signals, a microphone for capturing real-world audio, and other similar features and hardware of a computer, smartphone, smartwatch, cell phone, tablet computer, and the like.

Figure 2:
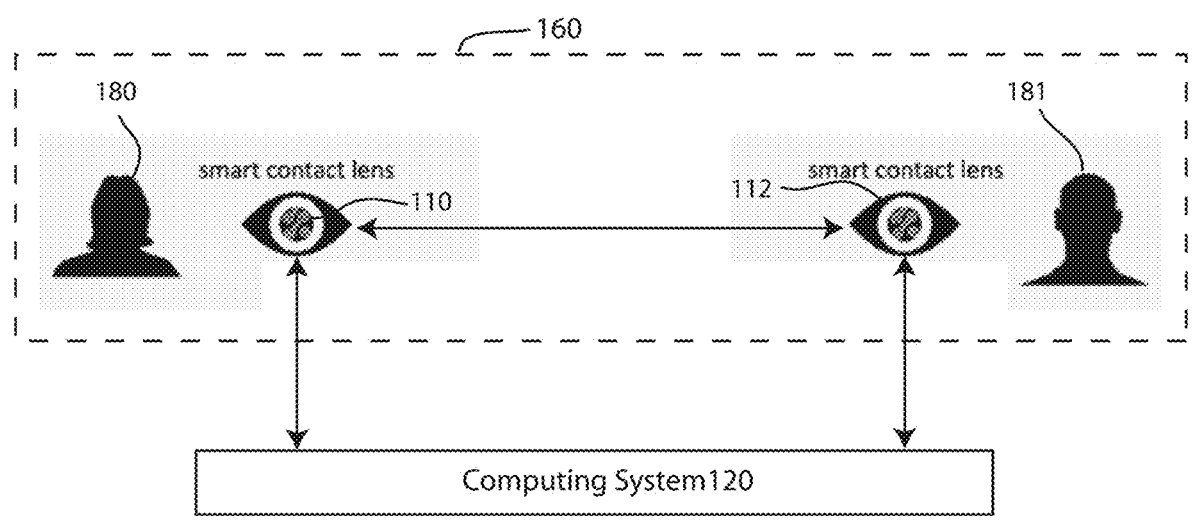
FIG. 2 depicts a block diagram of a first augmented reality device and a second augmented reality device connected to each other and to a computing system of FIG. 1, in accordance with embodiments of the present invention.

Similarly, the second augmented reality device 112 is an AR device that can be used by a second user for displaying AR in the second user's environment, which is co-located with the first user's environment. Although FIG. 1 depicts two augmented reality devices 110, 112, the augmented reality sharing system 100 can accommodate more than two connected augmented reality devices. The second augmented reality device 112 is configured to be worn by the second user. In an exemplary embodiment, the second augmented reality device 110 is a smart contact lens configured to be worn directly in the eye of the second user. The smart contact lens supports AR and has necessary components for communicating with the computing system 120 and optionally the second user mobile device 113. The second user mobile device 113 can be a cell phone, a mobile computing device, a smartphone, a tablet computer, a laptop computer, a wearable computing device, a smartwatch, or similar an internet-connected mobile device. The second user mobile device 113 can include hardware functionality such as a speaker for emitting a sound, a vibration motor for creating vibrations, a display for displaying images, text, messages, videos, pictorial sequences, etc., a light emitting element for emitting a light, a receiver for receiving communications, a transmitter for transmitting signals, a microphone for capturing real-world audio, and other similar features and hardware of a computer, smartphone, smartwatch, cell phone, tablet computer, and the like FIG. 2 depicts a block diagram of the first augmented reality device 110 and the second augmented reality device 112 connected to/paired with each other and to the computing system 120 of FIG. 1, in accordance with embodiments of the present invention. The devices 110, 112 are paired according to a set of predefined user rules that enables which augmented reality devices are allowed to connect/pair with the first augmented reality device 110. The predefined user rules governing pairing with other devices that enter the environment 160 containing the first AR device 110 are based on a status of the second user with respect to the first user. Examples of status include "friend," "contact", "favorite," "none," and the like. The first user may configure the pairing rules such that only users having a "friend" status can pair with the first user's AR device. The first user may configure the pairing rules such that any device within range of the first user's AR device should be paired, within the environment 160.

Environment 160 is a physical location in reality. The environment 160 is defined by one or more boundaries. The one or more boundaries defining the environment 160 can be a threshold distance between the devices 110, 112, a threshold distance (e.g. radial distance) measured from the first AR device 110 device or the second AR device 112, a predetermined geolocation having physical boundaries, such as a wall, a predetermined space or location governed by geofence properties, a pre-defined room, space, section, sector, classroom, hall, wing, zone, floor, etc. of a structure, and the like. Moreover, the environment 160 can be a static environment that is predefined or a dynamic environment that moves with the first AR device 110 (or second AR device 112). Exemplary embodiments of a static environment include a living room of a first user's house, a third floor of a building, a kitchen of a restaurant, a classroom of a school. By way of example, if both the first AR device 110 and the second AR device 112 are present in the same living room of the first user's house that has been pre-defined as an environment for sharing augmentations, then the first AR device 110 worn in the first user's eye permits the direct connection to the second AR device 112 worn in the second user's eye. Exemplary embodiments of a dynamic environment include a physical area surrounding the first AR device 110 that changes based on the physical location of the first AR device 112 as the first user moves. The size of the surrounding area depends on a specific, set physical distance (e.g. 20 foot radius from the device 110). By way of example, if a second user wearing a second AR device 112 comes within 12 feet of the first user AR device 110, then the first AR device 110 permits the direct connection to the second AR device 112 because the devices 110, 112 are co-located in an environment 160. Each of the AR devices are configured to communicate with various environmental sensors and/or micro-location devices (e.g. beacon devices) for improved location accuracy for indoor environments or large event structures, such as stadiums, arenas, etc.

Figure 3:
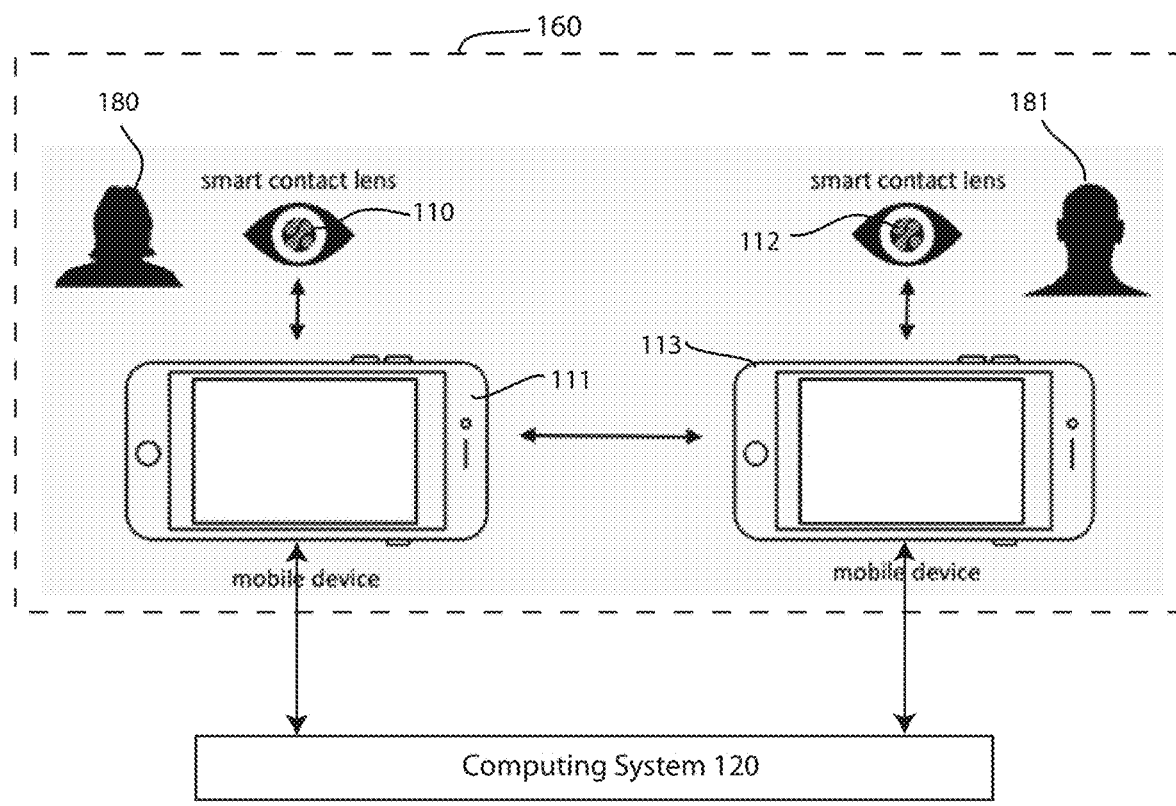
FIG. 3 depicts a block diagram of the first augmented reality device and the second augmented reality connected to each other, respective mobile devices, and to a computing system, in accordance with embodiments of the present invention.

As shown in FIG. 2, the first AR device 110 and the second AR device 112 connect directly to each other while also being connected to the computing system 120 over network 107 shown in FIG. 1. For instance, the first AR device 110 is paired with the second AR device 112 over a network, such as a short-range communication network, near field communication, and the like. Alternatively, the first AR device 110 is connected to a first user mobile device 111 and the second AR device 112 is connected to a second user mobile device 113. FIG. 3 depicts a block diagram of the first augmented reality device and the second augmented reality connected to each other, respective mobile devices, and to a computing system, in accordance with embodiments of the present invention. In the illustrated embodiment, the first AR device 110 is connected to/paired with the first user mobile device 111 over a first short range communication network, and the second first AR device 110 is connected to/paired with the second user mobile device 113 over a second short range communication network. In this way, the user mobile devices 111, 113 communicate with the computing system 120 over network 107, and then transmit data/information/commands to the respective AR devices 110, 112.

Referring back to FIG. 1, the computing system 120 of the augmented reality sharing system 100 is equipped with a memory device 142 which stores various data/information/code, and a processor 141 for implementing the tasks associated with the augmented reality sharing system 100. An augmented reality sharing rules application 130 is loaded in the memory device 142 of the computing system 120. The augmented reality sharing rules application 130 can be an interface, an application, a program, a module, or a combination of modules. In an exemplary embodiment, the augmented reality sharing rules application 130 is a software application running on one or more back end servers (e.g. computing system 120), servicing the first augmented reality device 110 and potentially a linked personal user computing device 111, and the first augmented reality device 110 and potentially a linked personal user computing device 113. In other embodiments, the augmented reality sharing rules application 130 is a software application running on the first user mobile device 111 controlling the first augmented reality device 110. Although FIG. 1 depicts the first user mobile device 111 as a separate component, the computing system 120 is the first user mobile device in embodiments that have the augmented reality sharing rules application 130 running on the first user mobile device. In further embodiments, aspects of the augmented reality sharing rules application 130 are loaded onto the computing system 120 and the user mobile device 111.

The augmented reality sharing rules application 130 of the computing system 120 includes a generation module 131, a device connection module 132, a tracking module 133, a rules module 134, and a sharing module 134. A "module" refers to a hardware-based module, a software-based module, or a module that is a combination of hardware and software, Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The generation module 131 includes one or more components of hardware and/or software program code for generating an augmented reality experience associated with a first augmented reality device configured to be worn by the user. For instance, the generation module 131 generates, renders, creates, etc. the augmented reality experience within the environment 160 containing the first user, as viewed by the first user using the first AR device 110. The augmented reality experience is an interactive and immersive real-world environment that includes computer-generated perceptual information generated by the generation module 131 so that the real-world environment is digitally manipulatable. The generation module 131 is communicatively coupled to one or more sensors of the first user AR device 110 and/or the first user mobile device 111, such as a GPS sensor, digital camera, accelerometer, gyroscopes, solid state compasses, RFID, and optical sensors. The sensors of the AR device 110 and the user mobile device 111 provide location-based information, environmental details, mapping information, image data (e.g. from camera(s)), etc. which is used by the generation module 131 in rendering the augmented reality experience within the environment 160. Additionally, the generating module 131 utilizes environmental sensors that may be located within the environment 160, such as beacon devices for micro-location data, cameras.

The device connection module 132 includes one or more components of hardware and/or software program code for connecting the first augmented reality device 110 with a second augmented reality device 112 configured to be worn by a second user in response to detecting that the second augmented reality device is co-located with the first user. For instance, the device connection module 132 initiates a pairing sequence between the first AR device 110 and the second AR device 112 in response to the second AR device 112 entering the environment 160. In an exemplary embodiment, the device connection module 132 initiates a pairing sequence once the second AR device 112 becomes physically close enough to the first AR device 110 such that the devices 110, 112 are co-located. By way of an example, if a first user is in the kitchen of the first user's house, and the second user walks into the kitchen, the device associated with the first user is begins a pairing sequence with the second device associated with the second user. The pairing sequence can be initiated by the device connection module 132 automatically once a second AR device 112 is detected within the environment 160 of the first user AR device 110, The pairing sequence initiated by the device connection module 132 includes an application of predefined user rules before completing the pairing sequence between devices. For instance, the device connection is performed according to a set of predefined user rules that enables which augmented reality devices are allowed to connect with the first augmented reality device. If the set of predefined user rules dictate that the second AR device is permitted to be paired with the first AR device 110, then the device connection module 132 completes the pairing sequence between the first AR device 110 and the second AR device 112. If the set of predefined user rules dictate that the second AR device is not permitted to be paired with the first AR device 110, then the device connection module 132 cancels the pairing sequence between the first AR device 110 and the second AR device 112. By way of example, a first user associated with a first AR device 110 has configured the rules to only allow contacts to be paired with the first user's AR device. A second user, who is the first user's spouse, and a third user, who is a salesman at a retail store, each wearing an AR device, move within a certain proximity to the first user and the first user's AR device. The device connection module 132 initiates a pairing sequence between the first user's AR device and the AR devices of the second user and the third user. The device connection module 132 applies the predefined user rules to only allow contacts and thus completes the pairing sequence between the first user's AR device and the second user's AR device because the second user is a known contact and cancels or otherwise does not permit the pairing between the first user's AR device and the third user's AR device because the third user is not a known contact. Accordingly, the device connection module 132 connects the first AR device 110 with approved second AR device 112 in response to detecting that the second AR device is co-located with the first user.

The tracking module 133 includes one or more components of hardware and/or software program code for tracking a first field of view of the first user and a second field of view of the second user to detect an instance of a matching field of view between the first user and the second user. For instance, the tracking module 133 monitors the field of view of the first user and a second, connected user within the environment. In an exemplary embodiment where the AR device is a smart contact lens, the first field of view and the second field of view of the first user and the second user, respectively, are tracked using a pupil tracking system associated with a smart contact lens. The smart contact lens beings the AR devices includes one or more cameras to track a direction of the pupil within the environment, and the tracking module 133 computes a field of view based on the data from the pupil tracking system. In other embodiments where the AR device is smart eyeglasses or a smart contact lens, the eyesight direction is captured and used to calculate a field of view. The AR eyeglasses or contact lens have a camera, such as a laterally placed camera positioned on the glasses or contact lens so that the camera(s) is lateral to the eye of the user. The camera detects an eyesight direction of the user as the users looks around environment 160. The eyesight direction is determined by locating a position or angle position of the eye, or pupil/iris of the eye with respect to the eyeglasses or the contact lens, Additional sensor(s) of the eyeglasses or contact lens may be used to determine a position and orientation of the eyeglasses (or a lens surface thereof) or the contact lens in physical space. With a known angle/position of the eyes with respect to the eyeglasses or the contact lens, and orientation information eyeglasses or contact lens, an eyesight direction is determined to calculate a field of view of the user within the environment 160 because the eyesight direction of the user indicates where the user is looking.

Figure 4:
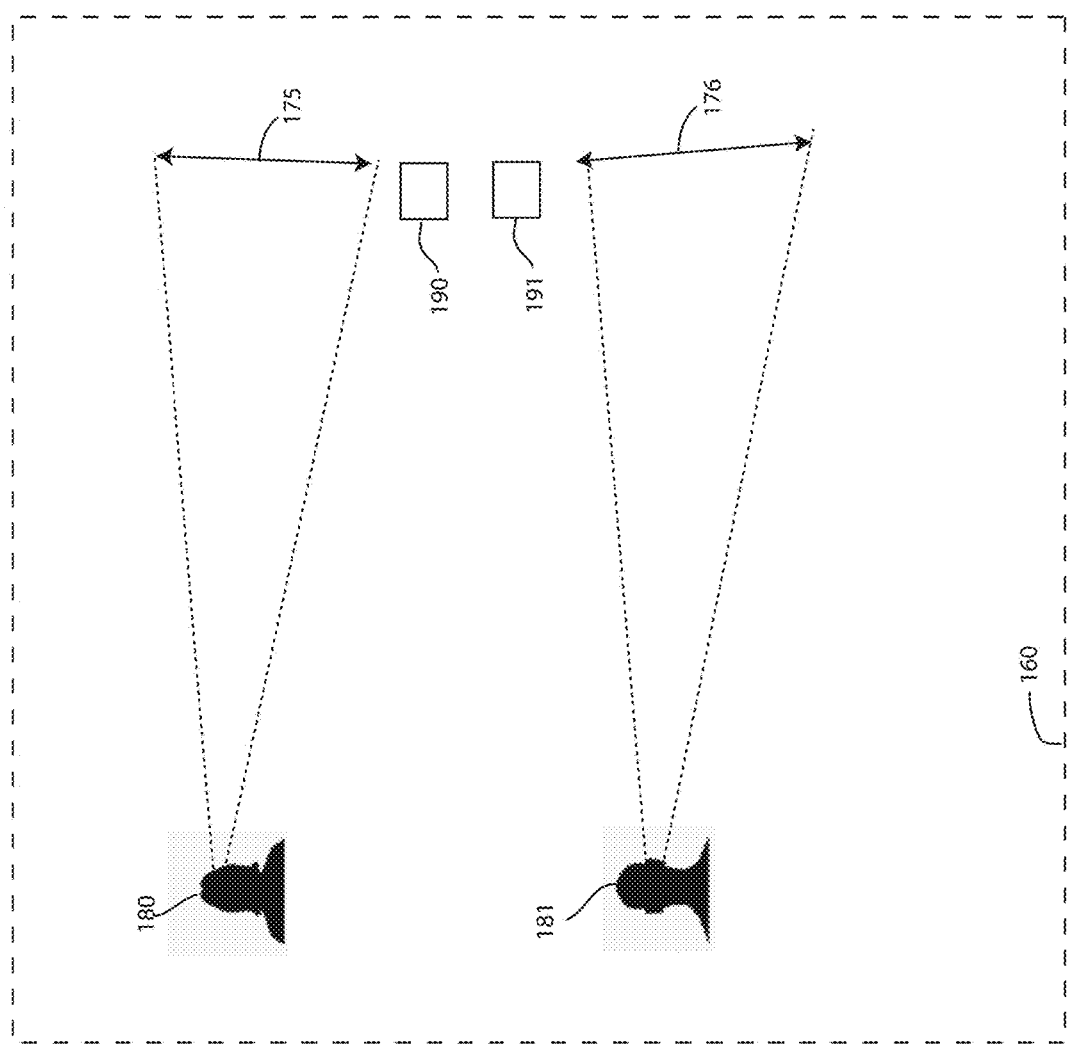
FIG. 4 depicts a schematic view of a first field of view of a first user and a second field of view of a second user within a shared environment, in accordance with embodiments of the present invention.
Figure 5:
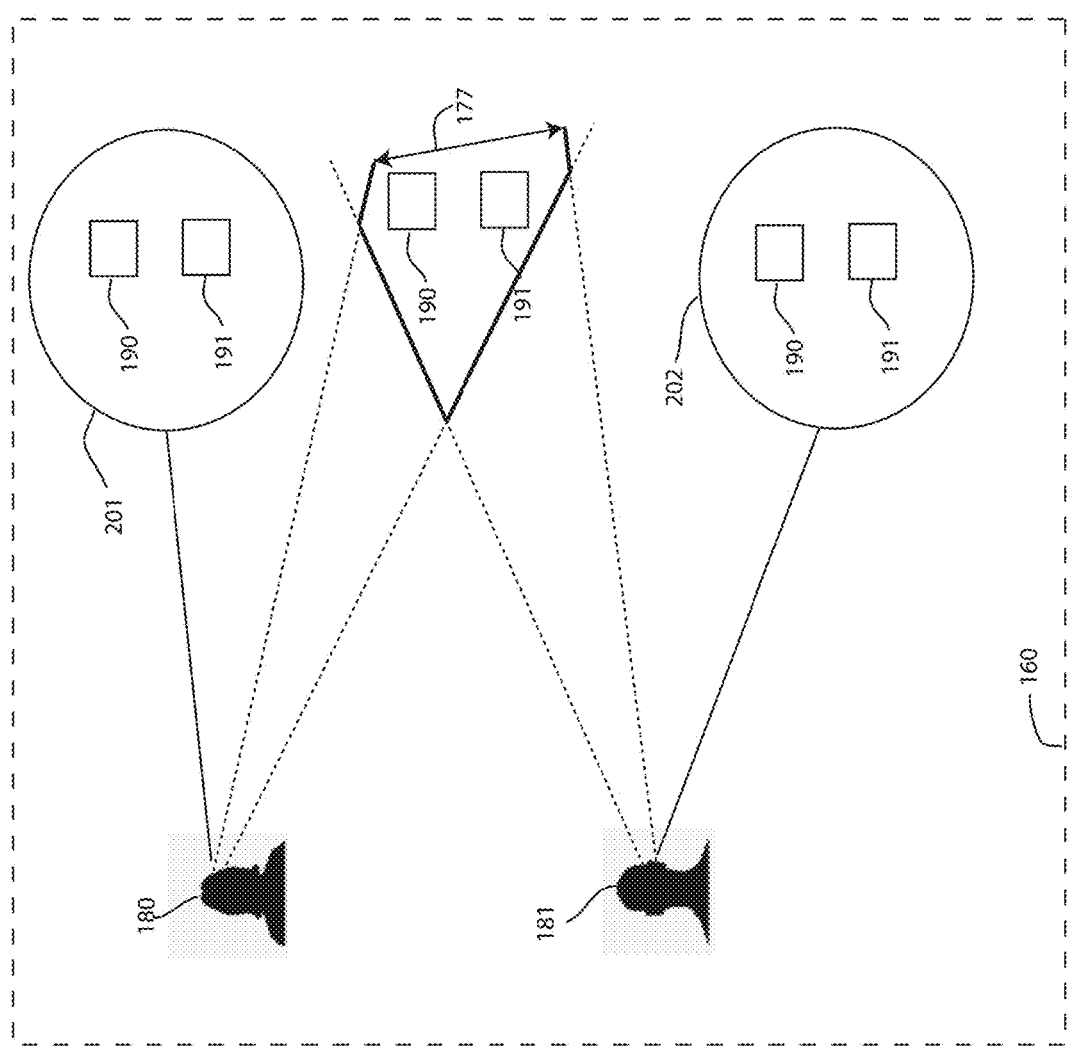
FIG. 5 depicts a schematic view of a detected matching field of view, in accordance with embodiments of the present invention.

FIG. 4 depicts a schematic view of a first field of view 175 of a first user 180 and a second field of view 176 of a second user 181 within a shared environment 160, in accordance with embodiments of the present invention. The field of view 175 of the first user 180 does not match in any areas with the field of view 176 of the second user 181, and neither the first user 180 or the second user 181 are looking at the objects 190, 191 within the environment 160. The tracking module 133 monitors the field of views 175, 176 of each connected user 180, 181 to detect an instance where the fields of view 175, 176, match or otherwise overlap in whole or in part. FIG. 5 depicts a schematic view of a detected matching field of view, in accordance with embodiments of the present invention. In the illustrated embodiment, the first user 180 is looking at objects 190, 191 within the environment 160. The field of view 175 encompasses the objects 190, 191. Similarly, the second user 181 is looking at objects 190, 191 within the environment 160, and the field of view of view 176 encompasses the objects 190, 191. As a result, there is a matching field of view 177 that is created by the overlap between the first field of view 175 and the second field of view 176. Diagrams 201 and 202 depict what the first user 180 and the second user 181 are viewing, respectively. Both the first user 180 and the second user 181 view the rendered objects 190, 191 without augmentation by the other user.

Figure 6:
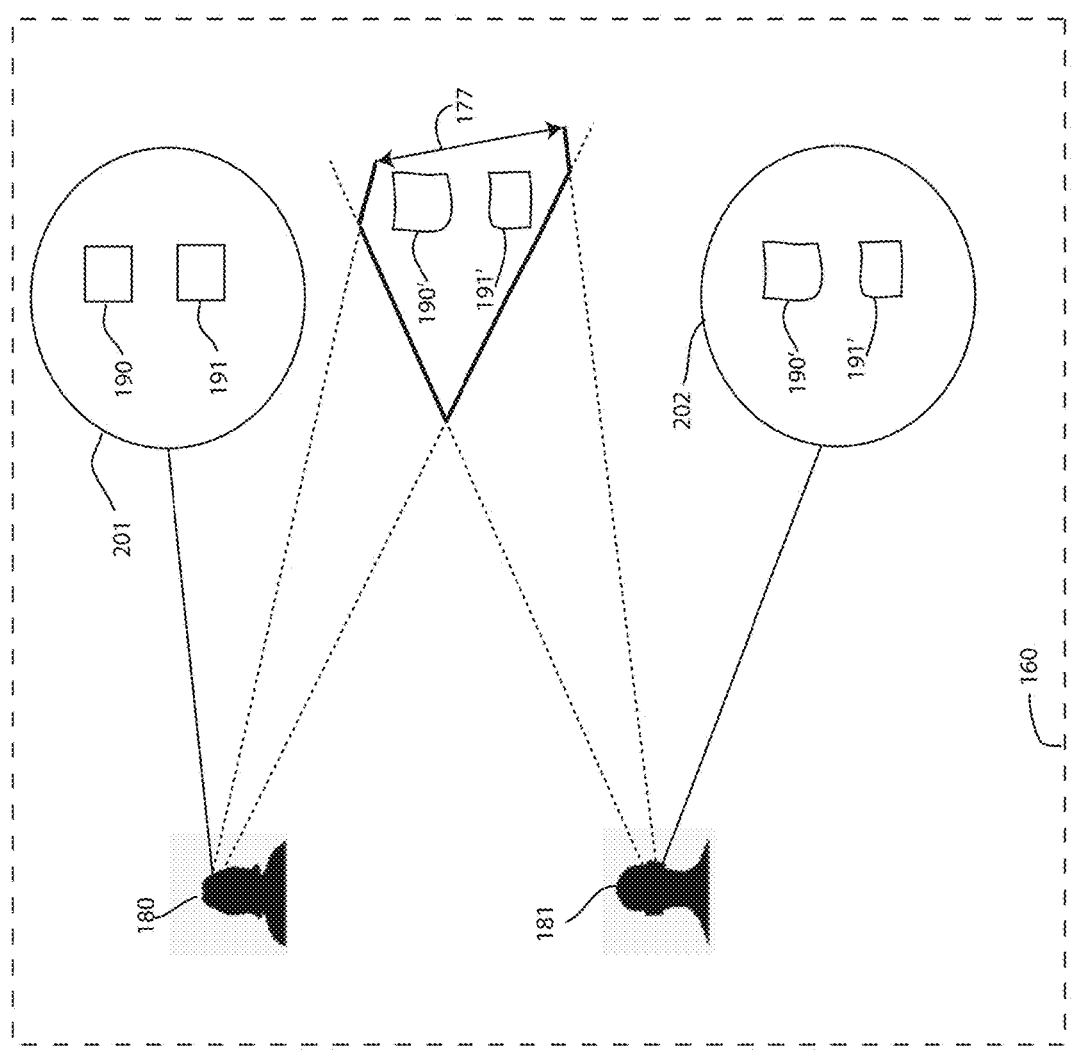
FIG. 6 depicts a schematic view of an augmentation rendered by the second user in the matching field of view of FIG. 5, in accordance with embodiments of the present invention.

The tracking module 133 detects the creation of the matching field of view 177 and continues to monitor the matching field of view 177 for any augmentations over the objects 190, 191, using an AR device. For instance, the tracking module 133 tracks or otherwise monitors user interaction with the augmented reality experience now co-viewed by the first user 180 and the second user 181. If the second user 181 interacts with the AR environment, the tracking module 133 detects that the second user 181 has rendered an augmentation over an object 190, 191 within the matching field of view 177. Examples of an interaction or rendering an augmentation over an object includes performing a command to ask what an object in the matching field of view 177 would look like if a specific object was added to the object, performing a request to see how a virtual sofa would look like between the objects in the matching field of view, and performing a command to change the colors of the objects within the matching field of view 177. FIG. 6 depicts a schematic view of an augmentation rendered by the second user 181 in the matching field of view 177 of FIG. 5, in accordance with embodiments of the present invention. In the illustrated embodiment, the objects 190' and 190' have been augmented in some manner by the second user 181. However, as shown in diagrams 201 and 202, only the second user 181 is viewing the augmented objects 190' and 191'. The first user is still viewing the objects 190 and 191 without the augmentation performed by the second user 181. The augmentations to the objects 190, 191 are not co-viewed by the first user 180 until a set of specific augmented reality sharing rules is applied. By requiring the application of specific, user-tailored rules, augmentations performed by other user are controlled so that the augmentations are not automatically visible to the first user.

The rules module 134 includes one or more components of hardware and/or software program code for applying the set of specific augmented reality sharing rules to determine whether to augment the augmented reality experience associated with the first augmented reality device 110 to display the augmentation rendered by the second user 181 in the matching field of view 177. For instance, prior to integrating the augmentations rendered by the second user 181, the rules module 134 determines whether the first user 180 should co-view the augmented object n the first user's AR device 110, even when the first user 180 and the second user 180 are sharing a field of view 177 (i.e. looking at the same object).

The set of specific augmented reality sharing rules are performed on a per person basis, a per object basis, a per augmentation basis, and a per location basis. A per person basis of the sharing rules determines which users have access to which augmentations. For example, a spouse can view all augmentations, whereas a friend is only given access to a subset. A per object basis of the sharing rules determines which specific objects an augmentation can be shared. For example, the rules may indicate that all augmentations related to household items should be shared, but augmentations to vehicles should not be shared. A per augmentation basis of the sharing rules determines which specific augmentations are appropriate to share. For example, the rules may indicate that augmentations related to instant messages should not be shared by augmentations to a color of an object should be shared. A per location basis of the sharing rules determines which specific locations augmentations can be shared. For example, the rules may indicate that all augmentations rendered in the kitchen of the first user should be co-viewed, but no augmentations should be co-viewed at stadium during an event. Additional sharing rules can be applied by the rules module 134 for determining whether augmentations rendered by another co-located party in a matching field of view should be co-viewed by the first user.

Figure 7:
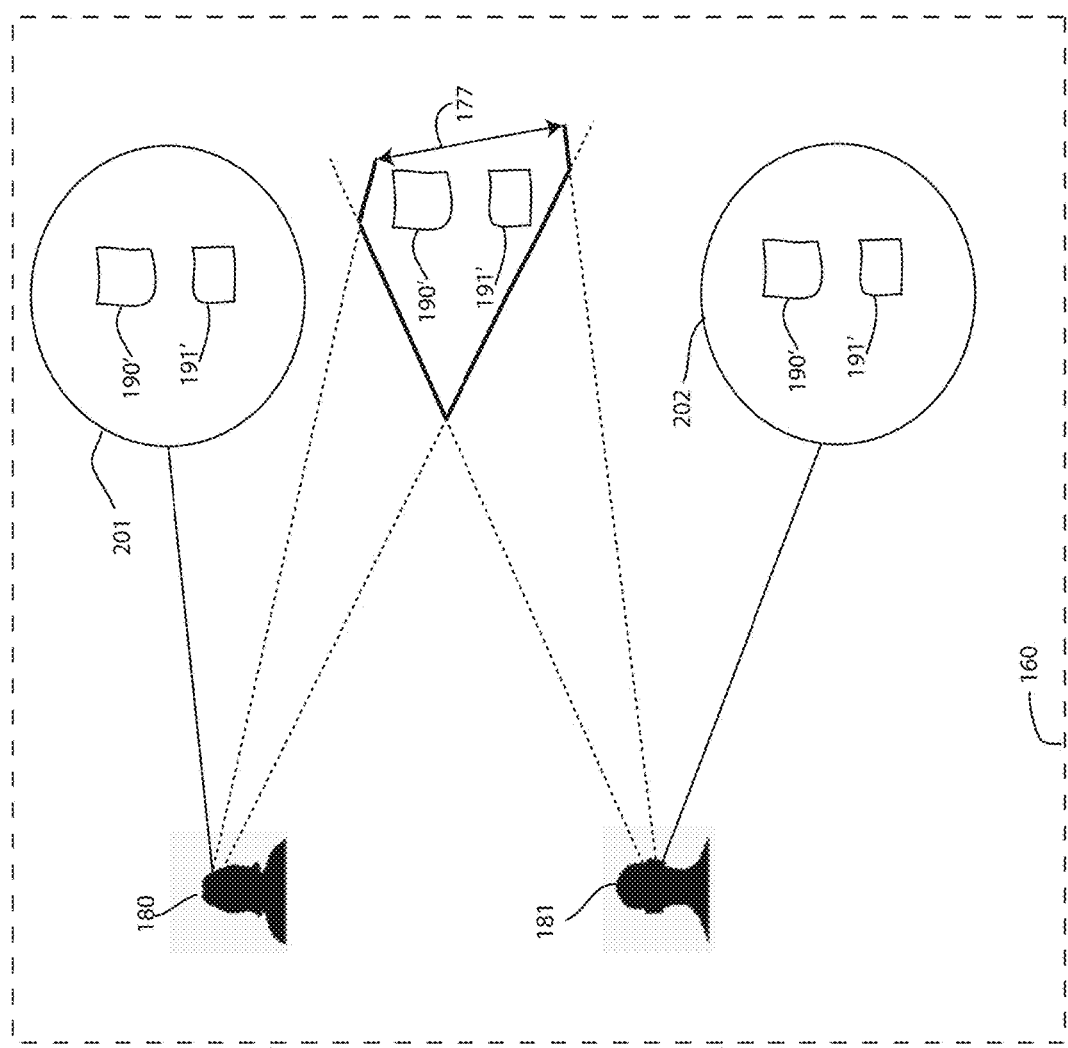
FIG. 7 depicts a schematic view of the augmentation rendered by the second user of FIG. 6 being displayed in the augmented reality experience of the first user in a first mode, in accordance with embodiments of the present invention.

The sharing module 135 includes one or more components of hardware and/or software program code for rendering the augmentation within the augmented reality experience associated with the first augmented reality device as a function of applying the set of specific augmented reality sharing rules. For instance, if the set of specific augmented reality sharing rules are applied and the result is that the augmentation detected in the matching field of view should be co-viewed, then the sharing module 135 renders the augmentation accordingly. The augmentation can be rendered in a mirrored augmentation mode such that the augmentation as viewed through the first augmented reality device is the same as the augmentation as viewed through the second augmented reality device. FIG. 7 depicts a schematic view of the augmentation rendered by the second user of FIG. 6 being displayed in the augmented reality experience of the first user in a first mode (e.g. mirrored mode), in accordance with embodiments of the present invention. In the mirrored mode, the augmented objects 190' and 191' are co-viewed exactly the same for both the first user 180 and the second user 181. Diagrams 201 and 202 each show the objects 190' and 191'.

Figure 8:
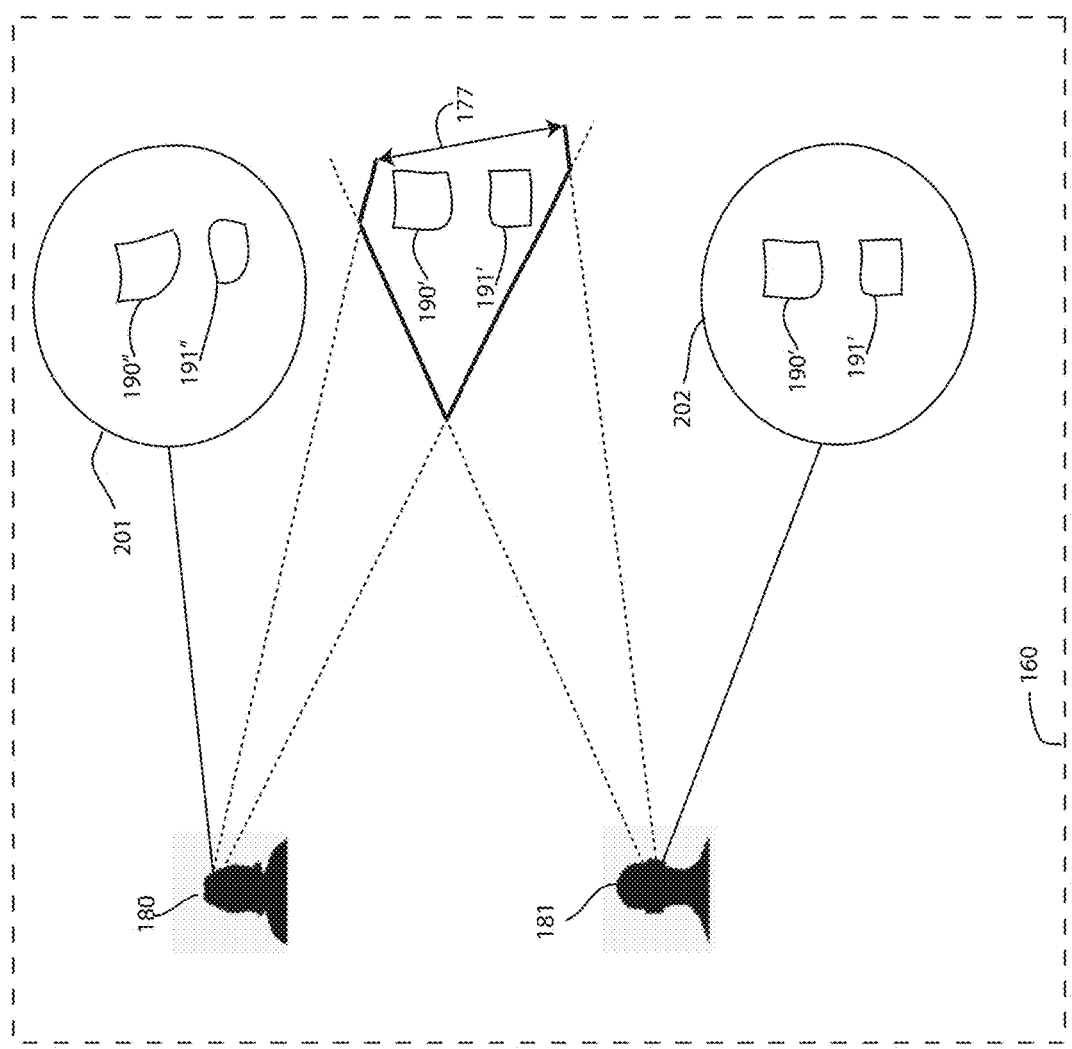
FIG. 8 depicts a schematic view of the augmentation rendered by the second user of FIG. 6 being displayed in the augmented reality experience of the first user in a second mode, in accordance with embodiments of the present invention.

Alternatively, the augmentation can be rendered in a collaborative augmentation mode such that the augmentation as viewed through the first augmented reality device is different than the augmentation as viewed through the second augmented reality device, allowing the first user and the second user to collaborate in a same augmented reality experience having the augmentation. FIG. 8 depicts a schematic view of the augmentation rendered by the second user of FIG. 6 being displayed in the augmented reality experience of the first user in a second mode (e.g. collaboration mode), in accordance with embodiments of the present invention. In the collaboration mode, the augmented objects 190' and 191' are co-viewed differently for both the first user 180 and the second user 181. Because after the initial augmentation from the second user 181 is shared in collaboration mode, the first user 180 can further augment the augmented objects to create further augmented objects 190" and 191" that are not visible to the second user. Diagram 201 shows the further augmented objects 190" and 191", while diagram 202 shows that the second user has not further augmented the augmented objects 190' and 191' and also does not view the augmentations performed by the first user 180. Moreover, the collaborative mode also supports sharing some of the same augmentations while keeping some rendering exclusive to the user. By way of example, a patient is laying on an operating table and a doctor and a support staff member are each wearing AR devices that are connected to each other. A general medical record and checklist is shared and co-viewed by the doctor and the support staff member. As an operation procedure progresses, the doctor sees augmentations to the general medical record and checklist that related to a surgical procedure, while the support staff member sees augmentations to the general medical record and checklist that related to the vitals of the patient.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the augmented reality sharing system 100 uses specific hardware, such as augmented reality devices (e.g. smart contact lenses), for displaying AR environments and augmentations to the AR environment made by other users operating connected devices. The AR displayed by the augmented reality devices can be augments according to specific set of rules that are uniquely applied to each user. The augmented reality sharing system 100 provides a technical solution by augmenting AR environments displayed by specialized devices based on a set of specific rules governing sharing of augmentations rendered by users of co-located and connected devices displaying the same AR environment.

Figure 9:
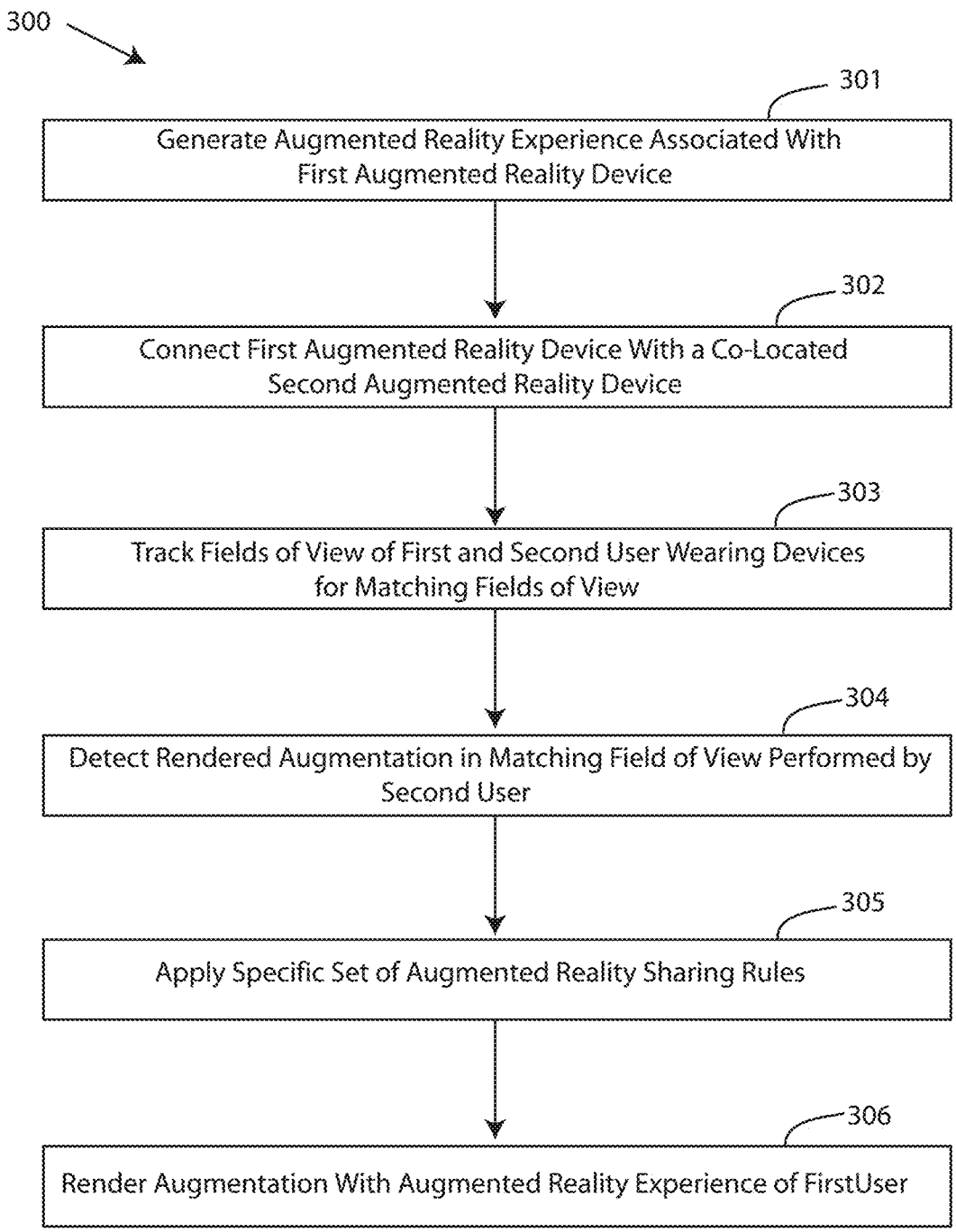
FIG. 9 depicts a flow chart of a method for displaying co-viewed augmented reality, in accordance with embodiments of the present invention.

Referring now to FIG. 9, which depicts a flow chart of a method 300 for displaying co-viewed augmented reality, in accordance with embodiments of the present invention. One embodiment of a method 300 or algorithm that may be implemented for augmented reality sharing with the augmented reality sharing system 100 described in FIGS. 1-8 using one or more computer systems as defined generically in FIG. 11 below, and more specifically by the specific embodiments of FIG. 1.

Embodiments of the method 300 for displaying co-viewed augmented reality, in accordance with embodiments of the present invention, may begin at step 301 wherein step 301 generates an augmented reality experience associated with a first augmented reality device. Step 302 connects the first augmented reality device with a co-located second augmented reality device. Step 303 tracks a field of view of a first user wearing the first augmented reality device and a field of view of a second user wearing the second augmented reality device for detecting a matching field of view. Step 304 detects rendered augmentation in the matching field of view performed by the second user. Step 305 applies the specific set of augmented reality sharing rules to determine whether to share or otherwise augment the augmented reality experience associated with the first augmented reality device. Step 306 renders the augmentation with the augmented reality experience of the first user as a result of the application of the specific set of rules.

Figure 10:
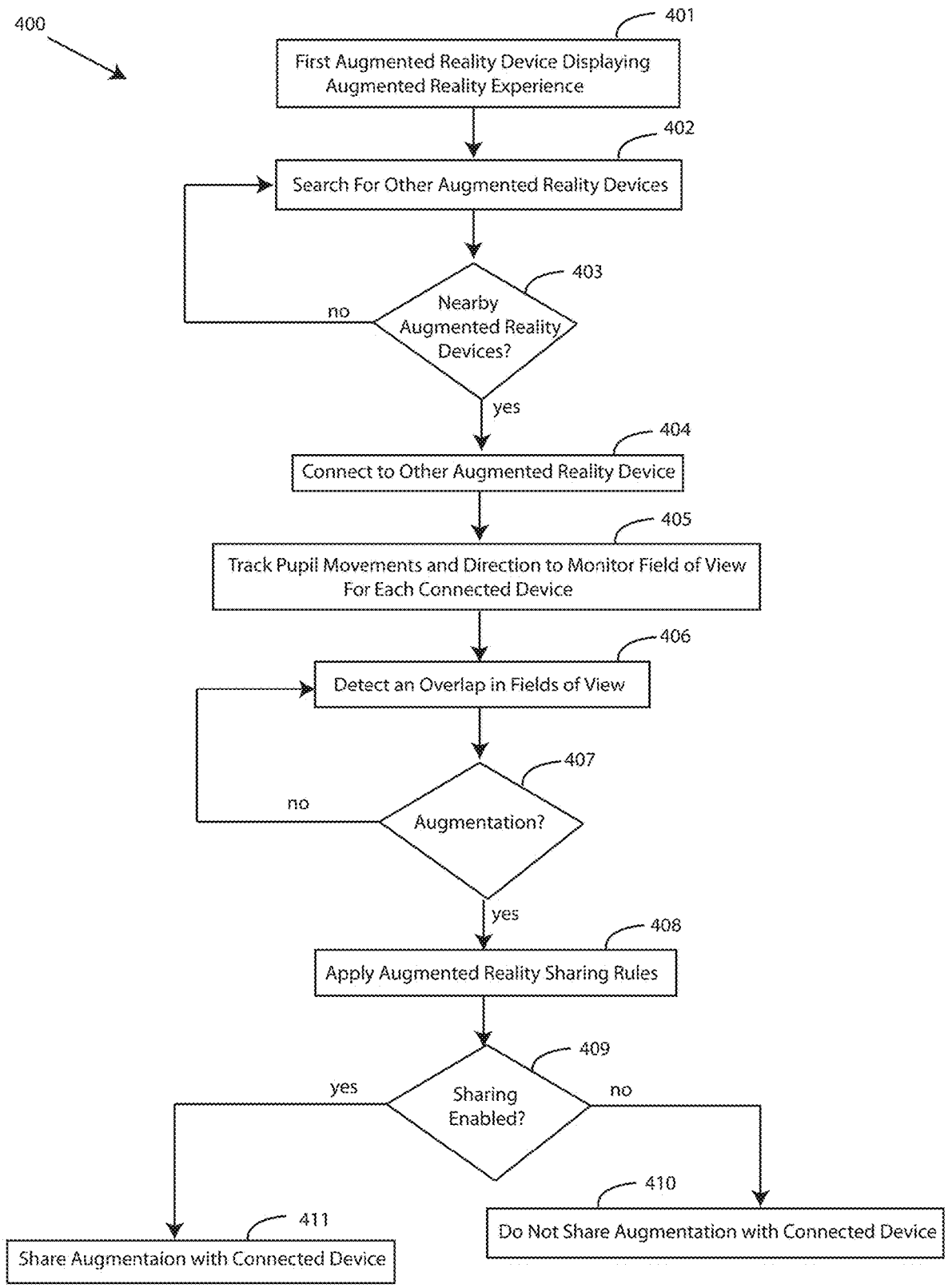
FIG. 10 depicts a detailed flow chart for displaying co-viewed augmented reality, in accordance with embodiments of the present invention.

FIG. 10 depicts a detailed flow chart of a method 300 for displaying co-viewed augmented reality, in accordance with embodiments of the present invention. At step 401, the first augmented reality device displays an augmented reality experience. Step 402 searches for other augmented reality devices. Step 403 determines whether other augmented reality devices are nearby the first augmented reality device. If no, then the method 400 returns to step 402. If yes, step 404 connects the first augmented reality device to the detected nearby augmented reality devices. Step 405 tracks pupil movements and direction of the user's eyes to monitor fields of view for each connected devices. Step 406 detects an overlap in the fields of view. Step 407 determines whether an augmentation has been rendered by one of the connected augmented reality devices. If no, then method 400 returns to step 406. If yes, then step 408 applies the specific set of augmented reality sharing rules. Step 409 determines whether sharing is enabled for the particular augmentation created by the other connected augmented reality, device. If no, then step 410 does not share the augmented with the first augmentation device. If yes, then step 411 shares the augmentation with the first augmented reality device so that the augmentation is co-viewed by the users.

Figure 11:
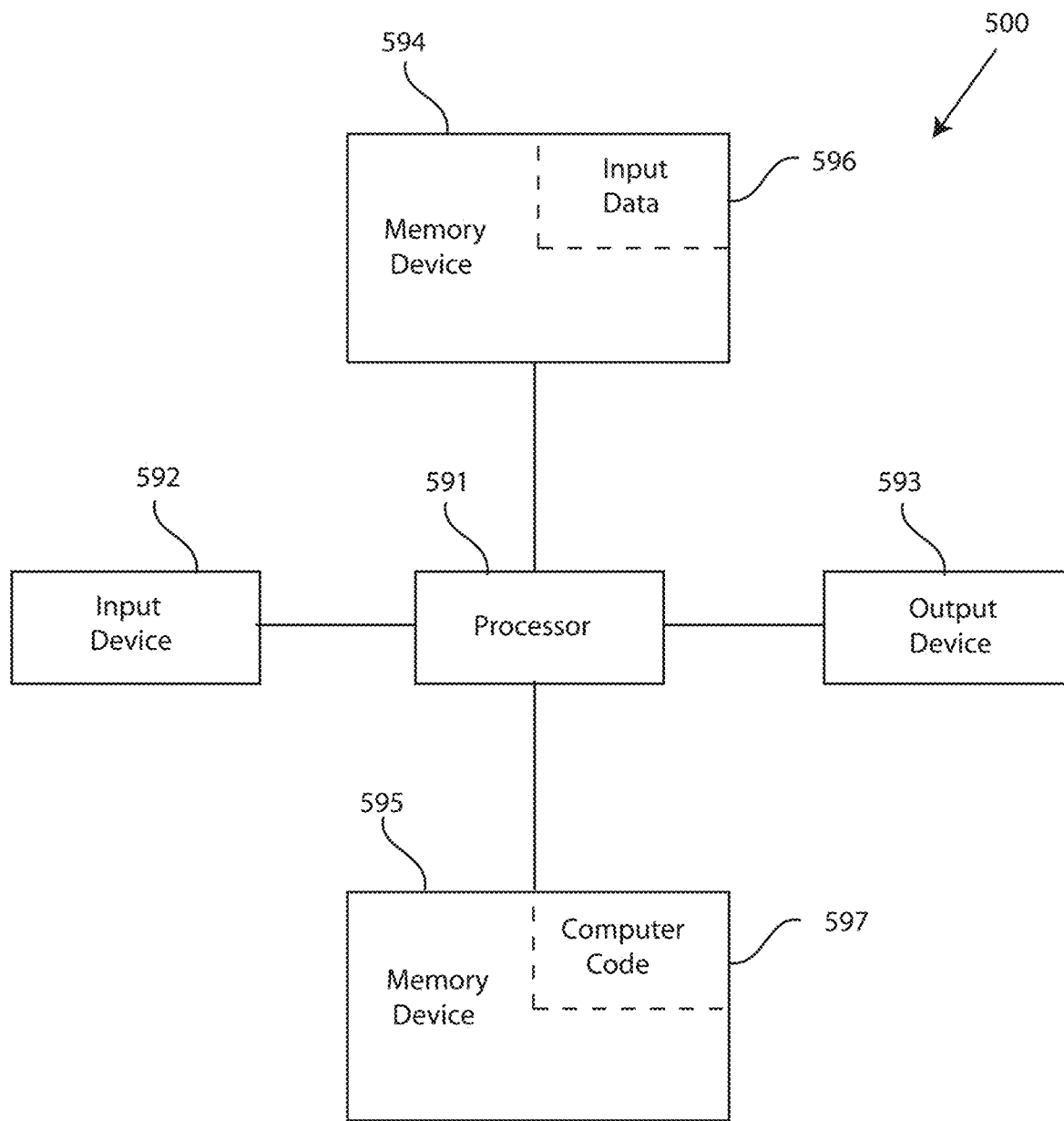
FIG. 11 depicts a block diagram of a computer system for an augmented reality sharing system of FIGS. 1-8, capable of implementing a for displaying co-viewed augmented reality of FIGS. 9-10, in accordance with embodiments of the present invention.

FIG. 11 depicts a block diagram of a computer system for the augmented reality sharing system 100 of FIGS. 1-8, capable of implementing methods for displaying co-viewed augmented reality of FIGS. 9-10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for displaying co-viewed augmented reality in the manner prescribed by the embodiments of FIGS. 9-10 using the augmented reality sharing system 100 of FIGS. 1-8, wherein the instructions of the computer code 597 may be executed by processor 591 via memory device 595. The computer code 597 may include software or program instructions that may implement one or more algorithms for implementing the method for displaying co-viewed augmented reality, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system. 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. r in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive a CD-ROM drive which receives a CD-ROM disk). In other embodiments, the data storage unit may include a knowledge base or data repository 5 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to displaying co-viewed augmented reality. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to provide assisted-learning with a portable computing device. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for displaying co-viewed augmented reality. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for assisted-learning with a portable computing device.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
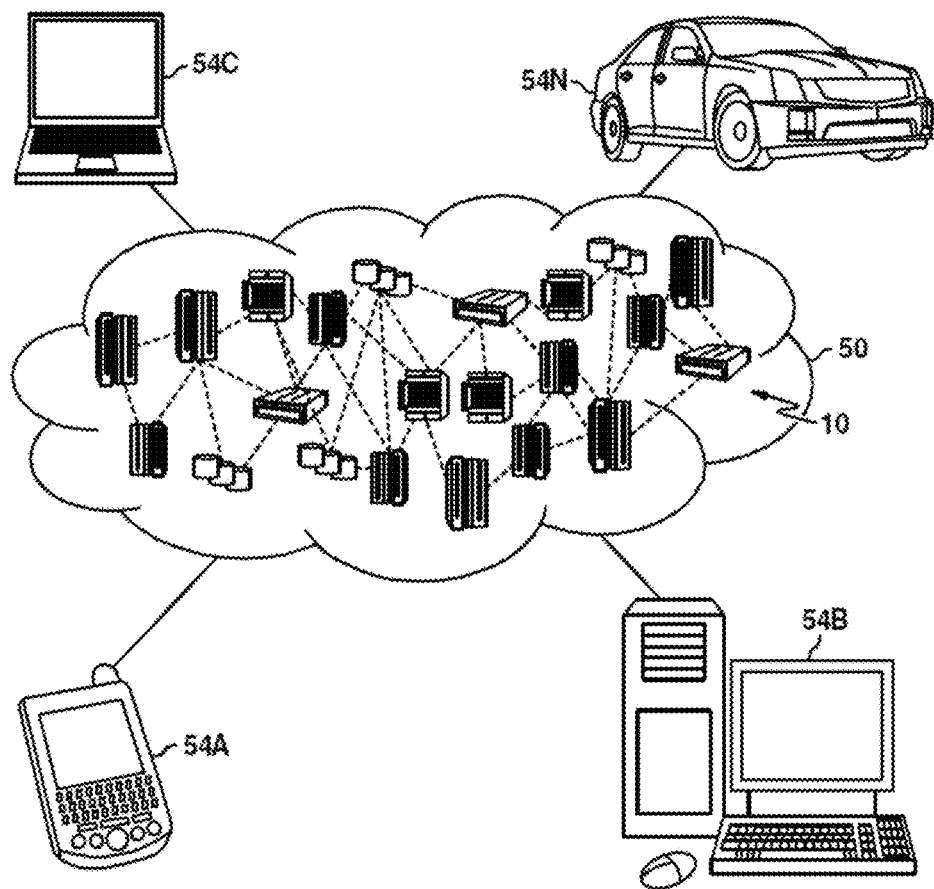
FIG. 12 depicts a cloud computing environment, in accordance with embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 13:
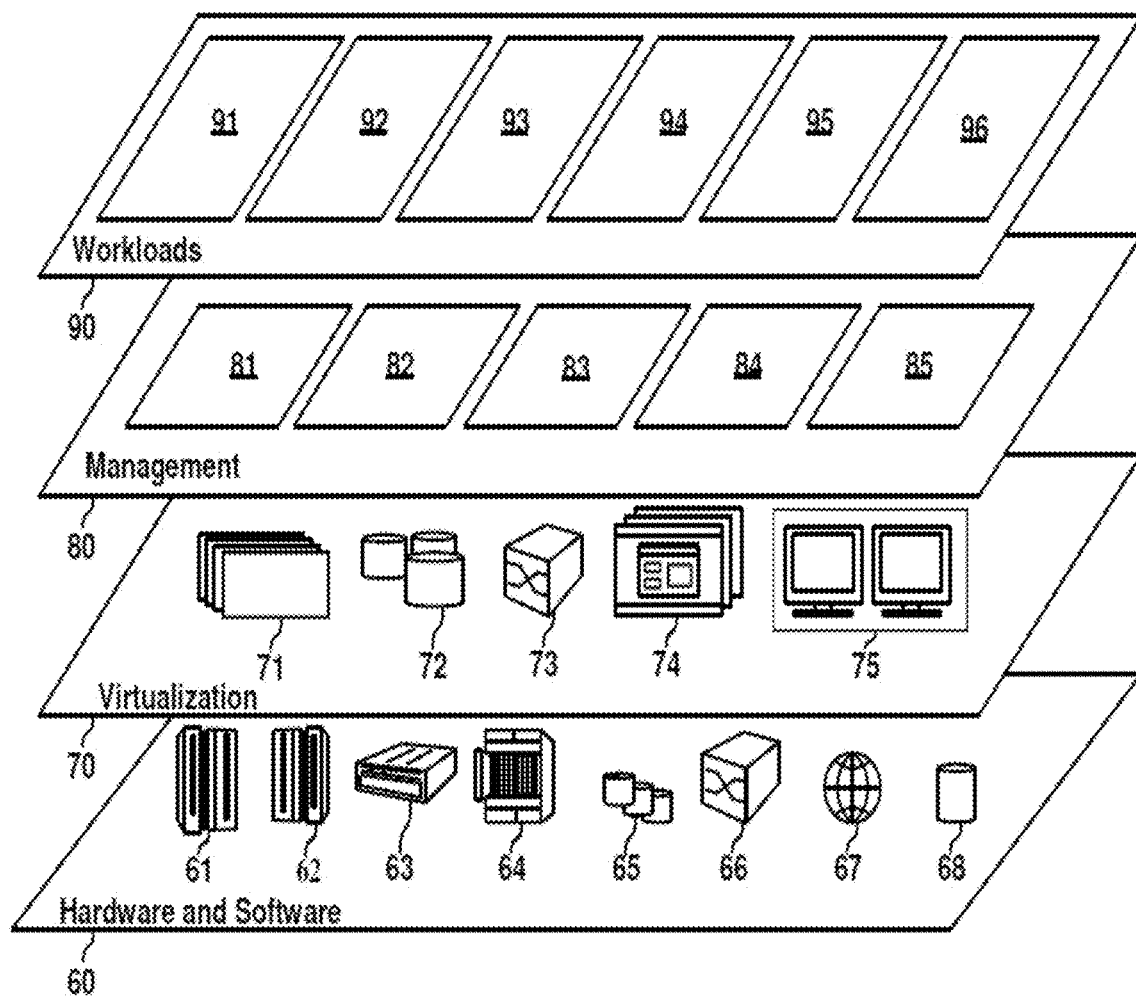
FIG. 13 depicts abstraction model layers, in accordance with embodiments of the present invention.

Referring now to FIG. 13, a set of functional abstraction layers provided by cloud computing environment 50 (see FIG. 12) are shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and ent 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and co-viewed augmented reality 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method comprising:
   generating, by a processor of a computing system, an augmented reality experience associated with a first augmented reality device configured to be worn by the user;
   initiating, by the processor, a pairing sequence between the first augmented reality device and a second augmented reality device configured to be worn by a second user, in response to detecting that the second augmented reality device is co-located with the first user, wherein the pairing sequence is either allowed to complete or cancelled depending on a status of the second user with respect to the first user;
   tracking, by the processor, a first field of view of the first user and a second field of view of the second user to detect an instance of a matching field of view between the first user and the second user;
   detecting, by the processor, that the second user has rendered an augmentation over an object within the matching field of view;
   applying, by the processor, a set of specific augmented reality sharing rules to determine whether to augment the augmented reality experience associated with the first augmented reality device to display the augmentation rendered by the second user in the matching field of view; and
   rendering, by the processor, the augmentation within the augmented reality experience associated with the first augmented reality device as a function of applying the set of specific augmented reality sharing rules.

2. The method of claim 1, wherein the first augmented reality device and the second augmented reality devices are each a smart contact lens that support augmented reality, configured to be worn in eyes of the first user and the second user, respectively.

3. The method of claim 2, wherein the first field of view and the second field of view are tracked using a pupil tracking system associated with the smart contact lens.

4. The method of claim 1, wherein the set of specific augmented reality sharing rules are performed on a per person basis, a per object basis, a per augmentation basis, and a per location basis.

5. The method of claim 1, wherein the augmentation is rendered in a mirrored augmentation mode such that the augmentation as viewed through the first augmented reality device is the same as the augmentation as viewed through the second augmented reality device.

6. The method of claim 1, wherein the augmentation is rendered in a collaborative augmentation mode such that the augmentation as viewed through the first augmented reality device is different than the augmentation as viewed through the second augmented reality device, allowing the first user and the second user to collaborate in a same augmented reality experience having the augmentation.

7. A computing system, comprising:
   a processor;
   a memory device coupled to the processor; and
   a computer readable storage device coupled to the processor, wherein the storage device contains program code executable by the processor via the memory device to implement a method comprising:
      generating; by the processor, an augmented reality experience associated with a first augmented reality device configured to be worn by the user;
      initiating, by the processor, a pairing sequence between the first augmented reality device and a second augmented reality device configured to be worn by a second user, in response to detecting that the second augmented reality device is co-located with the first user, wherein the pairing sequence is either allowed to complete or cancelled depending on a status of the second user with respect to the first user;

tracking, by the processor, a first field of view of the first user and a second field of view of the second user to detect an instance of a matching field of view between the first user and the second user;

detecting, by the processor, that the second user has rendered an augmentation over an object within the matching field of view;

applying, by the processor, a set of specific augmented reality sharing rules to determine whether to augment the augmented reality experience associated with the first augmented reality device to display the augmentation rendered by the second user in the matching field of view; and rendering, by the processor, the augmentation within the augmented reality experience associated with the first augmented reality device as a function of applying the set of specific augmented reality sharing rules.

8. The computing system of claim 7, wherein the first augmented reality device and the second augmented reality devices are each a smart contact lens that support augmented reality, configured to be worn in eyes of the first user and the second user, respectively.

9. The computing system of claim 8, wherein the first field of view and the second field of view are tracked using a pupil tracking system associated with the smart contact lens.

10. The computing system of claim 7, wherein the set of specific augmented reality sharing rules are performed on a per person basis, a per object basis, a per augmentation basis, and a per location basis.

11. The computing system of claim 7, wherein the augmentation is rendered in a mirrored augmentation mode such that the augmentation as viewed through the first augmented reality device is the same as the augmentation as viewed through the second augmented reality device.

12. The computing system of claim 7, wherein the augmentation is rendered in a collaborative augmentation mode such that the augmentation as viewed through the first augmented reality device is different than the augmentation as viewed through the second augmented reality device, allowing the first user and the second user to collaborate in a same augmented reality experience having the augmentation.

13. A computer program product, comprising a computer readable hardware storage device storing a computer readable program code, the computer readable program code comprising an algorithm that when executed by a computer processor of a computing system implements a method comprising:

generating, by the processor, an augmented reality experience associated with a first augmented reality device configured to be worn by the user;

initiating, by the processor, a pairing sequence between the first augmented reality device and a second augmented reality device configured to be worn by a second user, in response to detecting that the second augmented reality device is co-located with the first user, wherein the pairing sequence is either allowed to complete or cancelled depending on a status of the second user with respect to the first user;

tracking, by the processor, a first field of view of the first user and a second field of view of the second user to detect an instance of a matching field of view between the first user and the second user;

detecting, by the processor, that the second user has rendered an augmentation over an object within the matching field of view;

applying, by the processor, a set of specific augmented reality sharing rules to determine whether to augment the augmented reality experience associated with the first augmented reality device to display the augmentation rendered by the second user in the matching field of view; and rendering, by the processor, the augmentation within the augmented reality, experience associated with the first augmented reality device as a function of applying the set of specific augmented reality sharing rules.

14. The computer program product of claim 13, wherein the first augmented reality device and the second augmented reality devices are each a smart contact lens that support augmented reality, configured to be worn in eyes of the first user and the second user, respectively.

15. The computer program product of claim 14, wherein the first field of view and the second field of view are tracked using a pupil tracking system associated with the smart contact lens.

16. The computer program product of claim 13, wherein the set of specific augmented reality sharing rules are performed on a per person basis, a per object basis, a per augmentation basis, and a per location basis.

17. The computer program product of claim 13, wherein the augmentation is rendered in a mirrored augmentation mode such that the augmentation as viewed through the first augmented reality device is the same as the augmentation as viewed through the second augmented reality device.

18. The computer program product of claim 13, wherein the augmentation is rendered in a collaborative augmentation mode such that the augmentation as viewed through the first augmented reality device is different than the augmentation as viewed through the second augmented reality device, allowing the first user and the second user to collaborate in a same augmented reality experience having the augmentation.

* * * * *